United States Patent [19]

Schestag

[11] 4,143,367

[45] Mar. 6, 1979

[54] SAFETY DEVICE FOR LIMITING THE MOVEMENT OF DOORS AND THE LIKE ON CONTACT WITH AN OBSTACLE

[75] Inventor: Rudolf Schestag, Leonberg, Fed. Rep. of Germany

[73] Assignee: Erwin Sick Gessellschaft mit beschrankter Haftung Optik-Electronik, Waldkirch, Fed. Rep. of Germany

[21] Appl. No.: 837,898

[22] Filed: Sep. 29, 1977

[30] Foreign Application Priority Data

Oct. 2, 1976 [DE] Fed. Rep. of Germany ....... 2644608
Apr. 30, 1977 [DE] Fed. Rep. of Germany ....... 2719438

[51] Int. Cl.² ............................................. G08B 21/00
[52] U.S. Cl. .................................... 340/540; 340/545; 338/99; 200/61.43
[58] Field of Search ........................ 340/274 R, 419; 200/61.43; 338/78, 99, 100, 101, 110, 112, 114, 116, 198, 208, 224, 225, 226, 258

[56] References Cited

U.S. PATENT DOCUMENTS

| 2,305,717 | 12/1942 | LaBell | 338/114 |
| 2,951,817 | 9/1960 | Myers | 338/114 UX |
| 3,125,739 | 3/1964 | Deibel et al. | 338/99 |

FOREIGN PATENT DOCUMENTS

| 588819 | 12/1959 | Canada | 200/61.43 |
| 53382 | 8/1937 | Denmark | 200/61.43 |

Primary Examiner—Alvin H. Waring

[57] ABSTRACT

A safety device specially suitable for preventing the further movement of power operated parts such as doors of trams or garage doors on contact with an obstacle for example a human being. A resilient member is attached to the edge of the door and is provided with two electrodes so that a constant small current flows between the electrodes to indicate that the safety device is operational and wherein, on contact with the edge of the door, the resilient member deforms and gives rise to an increased current between the electrodes which is used as a control signal to inhibit further movement of the door. The increased current is achieved either by allowing the two electrodes to contact each other directly thus short circuiting a resistor or by making the resilient member conductive so that its resistance decreases during compression. The resilient member is located within an elongate slot in a rubber moulding having additional airfilled elongate slots for cushioning the edge of the door.

23 Claims, 11 Drawing Figures

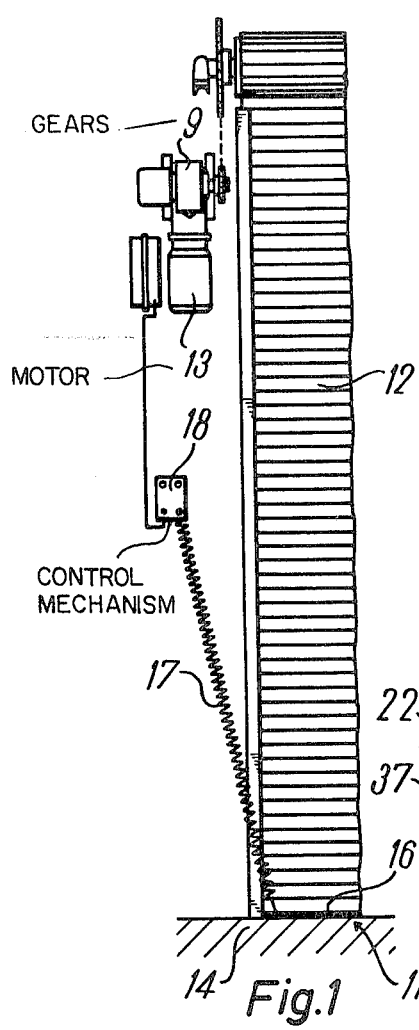
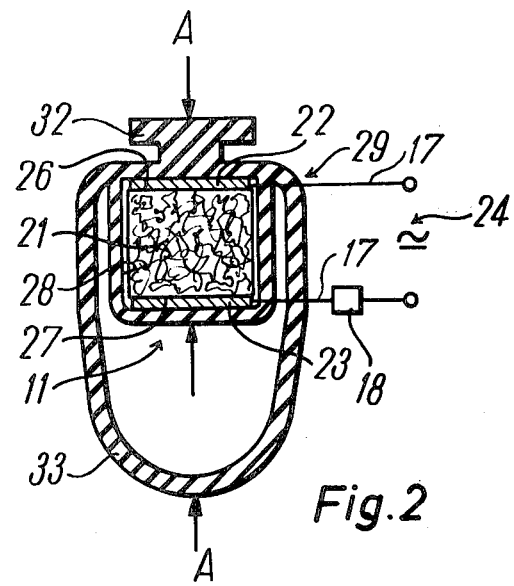
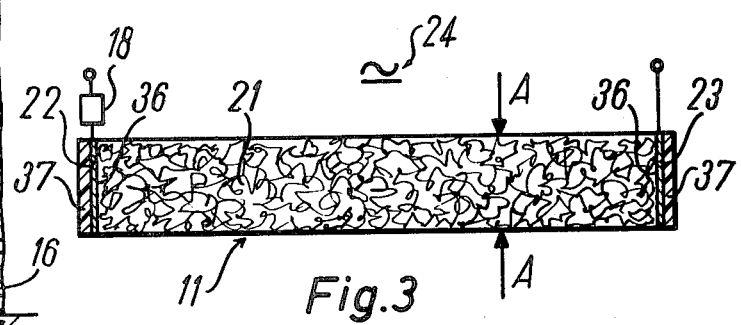
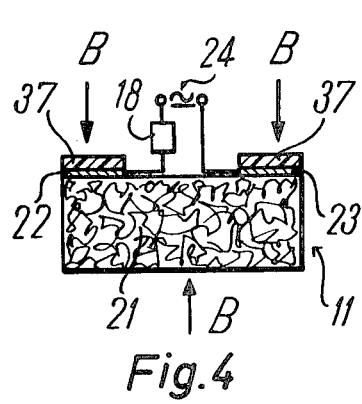
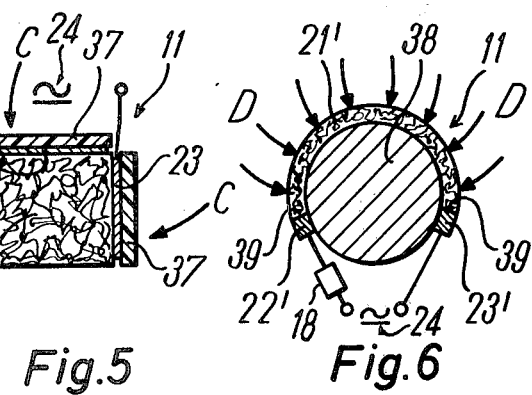
Fig.1  Fig.2  Fig.3  Fig.4  Fig.5  Fig.6

SAFETY DEVICE FOR LIMITING THE MOVEMENT OF DOORS AND THE LIKE ON CONTACT WITH AN OBSTACLE

BACKGROUND OF THE INVENTION

The invention relates to a safety device for use on compressing, shearing and closing edges in power-operated apparatus such as door and gate systems, presses and the like, with a signaller arranged substantially along the entire edge and connected to the drive of the power-operated apparatus via a control unit.

In known safety devices of this kind, the signaller is a flexible tube filled with air and connected to the control unit for the drive via a pressure wave switch. If the tube is compressed, for example by a person being caught between the closing door or doors of a lift, a pressure wave is produced which is converted by an electromechanical member and causes the drive to stop or operate in the reverse direction. A safety device of this kind has the disadvantage that it is not self-monitoring. If, for example, the air-filled tube has a defective or flawed area or is leaky, it is possible that the pressure wave produced on compression of the rubber hose will not reach the electromechanical transducer, since compressed air is escaping outwards at the defective point. However, this means that the safety device is out of order and will fail, without anyone having previously noticed the fact. This is a danger chiefly in power-operated devices, such as door and gate systems, mounted in the open air and thus exposed to the effects of weathering, with the result that, after a lengthy period of operation, the air tube used will in all probability cease to be sound.

Self-monitoring safety devices are known, such as so-called light barriers and ultrasonic barriers, for example. However, these known devices are very expensive, for one thing, and this in itself restricts their possible applications. What is more, it is not possible with these devices to secure edges uniformly along their entire length, e.g. along the main closing edge of a sliding door, since these devices can only be used at individual points.

A pressure-sensitive switch is also known, which contains a preferably cushion-shaped member made from a synthetic semiorganic elastic non-conductive substance such as silicone rubber, in which a quantity of individual, electrically conductive metal particles are dispersed. The dispersion of the particles is such that when the cushion is in its normal state, i.e. not under pressure, the electrical resistance of the cushion is infinitely great and thus the cushion is non-conductive. If the cushion is subjected to sufficiently great compressive forces, the particles are correspondingly pressed together into mutual engagement and the resistance of the cushion changes so that the cushion becomes electrically conductive. When the compressive force is released, the cushion returns to its normal uncompressed state, by its inherent elasticity, and the particles in turn move relative to one another and the cushion becomes non-conductive. This switch is not self-monitoring either, since no signal is produced if the cushion is damaged or torn away, for example.

The object of this invention is to provide a safety device of the kind described hereinbefore which is self-monitoring but can nevertheless be used economically to secure compressing, shearing and closing edges uniformly over their entire length. The safety device should, in particular, be useable in all apparatus in which dangerous shutting movements occur and should also safely prevent people or objects from being trapped in the case of breakdown.

BRIEF SUMMARY OF THE INVENTION

To solve this problem, it is provided according to the invention that a quiescent current flows from one electrode to the other in the signaller and is reduced or interrupted by any damage to the signaller and increased by compression of the signaller. Thus, the functioning capability of the signaller can be monitored constantly by monitoring the quiescent current.

In a preferred embodiment, the signaller is an elastically deformable member impregnated with a conductive lacquer and preferably made from a cellular polymer material and is connected at two points remote from each other to a voltage source, via the control mechanism, in an electrically conductive manner.

The elastically deformable member impregnated with a conductive lacquer has a specific current-flow resistance, in its uncompressed state. If the member, mounted on an edge of a power-operated apparatus which is to be made safe, is compressed anywhere along its length, the electrical resistance is reduced not only at this point, but everywhere with the result that the control current, for example, also changes. This change in the electrical resistance is used to produce a signal, whereby the drive of the power-operated apparatus is stopped or put into reverse. This may occur, for example, as the result of the de-energizing of a relay provided in the lead wire to the drive. Damage to the elastically deformable conductive member also causes a change in resistance, which means that the safety device according to the invention is self-monitoring. In this way a self-monitoring safety device is provided which can be manufactured at low cost and is therefore economical to use. The device according to the invention also makes it possible to stop the relevant drive of the power-operated apparatus or to put it into reverse, regardless of the area, or even point, on the edge provided with the slastic conductive member where pressure is exerted by an object or person moving into the vicinity of this member. The device according to the invention also has the advantage that the signalling member can be adapted to or cut to fit the shape of the appropriate compressing, shearing or closing edge.

The signalling member preferably consists of open celled, softly elastic foam plastics into which the conductive lacquer is rolled and subsequently dried. This ensures that the conductive lacquer adheres substantially uniformly to the cell walls, on the one hand, and also connects the open-pored cells to one another in a conductive manner. In order to ensure that the resistance is substantially equal in different areas over the entire volume, and hence that substantially the same change in resistance is obtained in each case when the conductive foam is compressed at any point, it is advisable for the open celled, softly elastic foam plastics to have cells of uniform size. The conductive lacquer may be a standard commercial lacquer, i.e. consisting of a binder and electrically conductive particles such as powdered silver or copper and/or carbonaceous solids such as carbon black or graphite. If desired, open-celled sponge rubber may be used as the elastically deformable member instead of foam plastics.

Another advantageous embodiment is characterised in that the signaller comprises at least two electrical conductor members which are held at a certain spacing by an elastically deformable insulating member in the idle state, and that the conductor members are connected, near one end, to a control mechanism and a voltage source and, near the other end, to one another via a measuring resistor.

This embodiment thus also operates on the quiescent current principle, whilst the closed circuit which makes self-monitoring possible is formed by connecting the conductor members via a measuring resistor. If the signalling member provided on an edge of a power-operated apparatus in order to make it safe is compressed anywhere along its length, the two conductor members come into contact with each other, resulting in a change in the resistance in the closed cirauit. This change in the electrical resistance is used to produce a signal and the drive of the power-operated apparatus is stopped or put into reverse by a relay, for example. Damage to the conductor members also produces a change in resistance, since in this case one of the two conductors is cut off and thus the circuit is broken. This means that the safety device according to the invention is self-monitoring. As long as the circuit is broken, it is impossible to operate the power-operated apparatus for windows, doors, gates, presses and the like. It enables the drive in question to be stopped or put into reverse regardless of the area—or even point—at which pressure is exerted on the signaller by an object or person moving into the area of the relevant edge. The device according to the invention also has the advantage that the signaller can be adapted to or cut to fit the shape of the relevant compressing, shearing and/or closing edge, even if the edge to be secured is not straight, as is the case, for example, with the edges of doors in trams and buses, which are curved at the bottom.

In a preferred exemplary embodiment of the present invention, the conductor members are formed by electrodes in the form of strips, which are located opposite one another in grooves in a single insulating member or mounted on opposite surfaces of a multi-sectional insulating member. It is possible to arrange two electrodes in a central longitudinal area of the insulating member; however, in some cases, it may be advisable to arrange two sets of two strip-shaped electrodes on the insulating member symmetrically to its central longitudinal plane and connect them in parallel. The electrodes may consist of copper foil stuck on to the insulating member, but they may also be formed by conductive material sprayed on to the appropriate area of the insulating member.

In a preferred exemplary embodiment of the present invention, the conductor members are formed by two elastically deformable foam strips, preferably of a cellular polymer material, impregnated with a conductive lacquer and held at a spacing by an insulating member. Thus, in this exemplary embodiment, the conductor members themselves are elastically deformable so that they come into contact with each other at a specific pressure and can thus cause a change in resistance in the closed circuit.

The signaller formed in this way is appropriately embedded in an elastically deformable hollow profile, of rubber, for example, which may substantially take the form of a flexible tube as used in pneumatic safety devices, especially on its fastening side. In this way, on the one hand the signaller is protected from external influences and on the other hand it is easy to change power-operated apparatus over to the safety device according to the invention. The elastically deformable profile, which can be relatively rigid, depending on the desired minimum pressure, has an elastically yielding area capable of absorbing the unavoidable running on of power-operated apparatus after they are switched off or reversed, this area being provided between the fastening side of the profile and the cavity which receives the signaller. In this way, additional protection is obtained by a simple construction of the profile.

Advantageous developments of the invention are specified in the sub-claims.

Further details and embodiments of the invention are given in the following description, wherein the invention is described and explained in more detail with reference to the exemplary embodiments shown in the drawings.

BRIEF DESCRIPTION OF DRAWINGS

The drawings show:

FIG. 1: a diagrammatic partial view of a closed roll-down door with the safety device according to the invention, FIG. 2: the cross section of a strip-shaped signaller according to the invention, used in a roll-down door as in FIG. 1, with the electrical circuit shown diagrammatically, FIG. 3: a longitudinal section through an elastic plastics strip of limited conductivity in a safety device according to the invention, FIGS. 4 to 6: cross sections of other exemplary embodiments of plastics strips in a safety device according to the invention.

DETAILED DESCRIPTION

Figure 7:
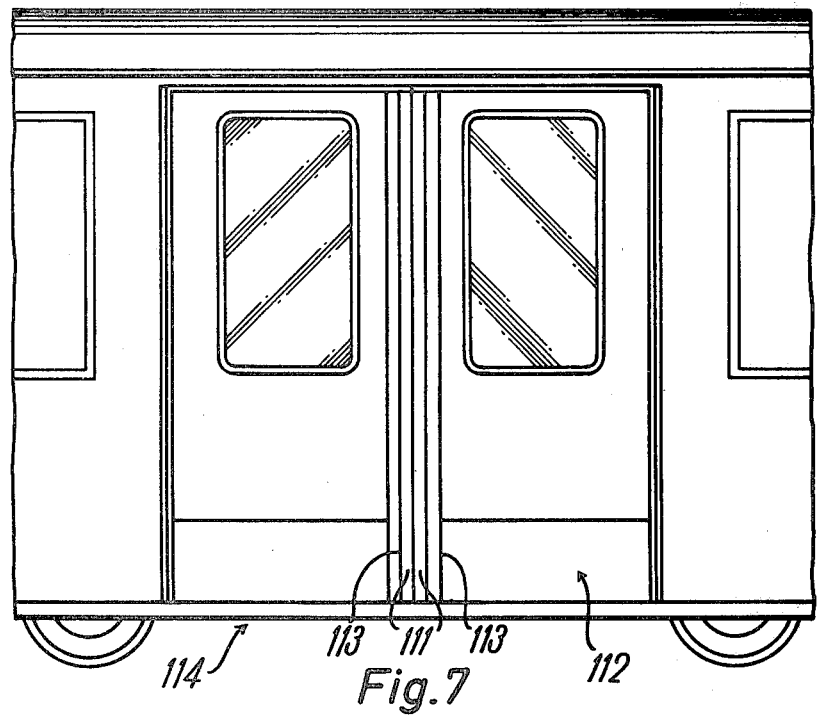
FIG. 7: a side view of the door region of a rail vehicle with another embodiment of a safety device according to the invention.

According to FIG. 1, a sliding door can be rolled up and down on a steel tube at its upper end, this tube being driven by a reversible electric motor 13 via gears 9. The roll-down door 12 comprises, along its entire longitudinal edge 16 facing the ground 14, a strip-shaped signaller 11 of limited electrical conductivity which is connected, via an electrical control wire 17, to a control mechanism 18 which stops the drive motor 13 or sets it turning in the opposite direction when the signaller 11 responds during the closing of the roll-down door 12.

According to FIGS. 2 to 6, the signaller 11 consists of an elastically deformable strip 21 of open-celled, softly elastic foam plastics impregnated with a conductive lacquer. The conductive lacquer is introduced into the cellular polymer material, preferably by rolling, in such a way that the walls of the open cells of the foam plastics are substantially completely and uniformly covered and are connected to one another in electrically conductive manner by the conductive lacquer which adheres to the walls. The foam plastics is dried after the conductive lacquer has been rolled in, so that the plastics strip 21 is substantially dry. The conductive lacquer, which has a specific resistance value, is made up of a binder and corresponding conductive particles which may consist of a powdered metal, such as silver or copper, or carbonaceous solids, such as carbon black or graphite. In this way, the foam plastics strip 21 has a pre-determined finite electrical current-flow resistance appropriately being substantially the same in each area, by virtue of the fact that the open-celled foam is provided with cells or pores of substantially the same size.

According to FIG. 2, the oblong conductive strip 21, which is rectangular or square in cross section, is covered along the entire length of its upper and lower longitudinal surfaces 26 and 27 with electrodes 22 and 23 which are connected to an AC or DC control voltage source 24 via a control mechanism 18 and are connected to one another in electrically conductive manner solely by the strip 21 of limited conductivity. The electrodes 22 and 23 are mounted on the strip 21 in such a way that there is no appreciable electrical current-flow resistance between the electrodes 22, 23 and strip 21. This can be done, for example, by means of a conductive adhesive or by placing the strip 21 together with the electrodes 22, 23 under slight prestressing in a compressible clamp.

In the exemplary embodiment shown in FIG. 2, the signaller 11 is placed in a cavity 28 extending lengthwise in an elastic profile 29, which is preferably made of rubber. Prestressing can be produced by lightly compressing the foam plastics strip 21 after it has been inserted in the cavity. At one point on the rubber profile 29, which is open only at the ends and is available by the meter, there emerge two leads 17 which are connected to the electrodes 22, 23 and lead to the voltage source 24 and control mechanism 18. The rubber profile 29 also comprises, on its upper longitudinal edge, a double T-shaped strip 32 by means of which it can be fastened in a corresponding profile on the longitudinal edge 16 of the roll-down door 12. Moreover, the rubber profile 29 comprises a sealing lip 33 surrounding the part 28 with the signaller 11, and this lip can be compressed to form a seal between the roll-down door 12 and the ground 14 without compressing the signaller 11 as well. This ensures that the safety device is triggered even by slight impact. A special limit switch is provided for arresting the device in the closed position. The hollow profile 29, which may advantageously be replaced by an air tube as used in previous safety devices, and the signaller 11 extend substantially over the entire length of the edge 16 of the roll-down door 12.

The safety device according to FIGS. 1 and 2 provided with the signaller 11 operates as follows:

If a vehicle or person or some other object is located between the ground 14 and the closing edge 16 when the roll-down door is closing, first the sealing lip 33 and then the conductive foam strip 21 of the signaller 11 is compressed at this point by the compressive forces A which occur as the hollow profile 29 makes contact with the object or person. The compression of the conductive strip 21, which the electrodes 22, 23 can follow, causes a reduction in the current-flow resistance between the electrodes 22 and 23. This reduction in the resistance of the conductive strip 21 or of the signaller 11 has the result that, because the electrodes 22, 23 are connected to the voltage source 24 via the control mechanism 18, the control current increases. This increase in the control current is used in the control mechanism 18 to activate a relay, for example, which stops the drive motor or puts it into reverse.

If the signaller 11 is damaged in any way, for example by a piece being torn out of the conductive strip 21, the current-flow resistance increases, and this results in a reduction in the control current and may cause a threshold circuit in the control mechanism 18 to respond, thus interrupting the drive for the roll-down door 12 until the damage is repaired and the normal current-flow resistance of the strip 21 is restored. Appropriately, the circuit may be designed so that damage to the signaller 11 prevents the roll-down door 12 not only from opening but also from closing. Thus, the safety-device according to the invention is self-monitoring. The change in resistance which is sufficient to produce a signal is independent of the point where the foam plastics strip 21 is compressed.

FIGS. 3 to 6 show further exemplary embodiments of signallers 11 comprising a conductive foam plastics strip and two electrodes 22 and 23; these signallers can be used on compressing, shearing or closing edges of various power-operated apparatus, particularly presses, as well as on the roll-down door 12 shown in FIG. 1 or other door systems such as lift doors or sliding doors in vehicles, for example.

According to FIG. 3, the oblong conductive foam plastics strip 21, which is shown in longitudinal section, is provided with the electrodes 22, 23 not on two of its longitudinal sides but on both its end faces 36. The electrodes 22, 23 covering the whole of the end face 36 are each covered by a thin, flexible, non-conductive plate 37, consisting of a suitable plastics material, for example. Such plates 37 protecting the electrodes may also be provided in the exemplary embodiment in FIG. 2 and, like the electrodes 22, 23, may extend over the entire longitudinal surfaces 26, 27 of the strip 21. Unlike in the conductive strip 21 according to FIG. 2, wherein the compressive forces occurring in the direction of the arrow A act on the electrodes 22, 23 at every point along its length, the compressive forces A in the exemplary embodiment according to FIG. 3 are effective between the two electrodes 22 and 23 arranged at the ends of the strip 21. This means that the same degree of compression causes a substantially greater change in resistance in the conductive strip 21 according to FIG. 2 than in the arrangement according to FIG. 3. Thus, the choice of the most suitable arrangement for a specific power-operated apparatus is largely dependent on the desired sensitivity of the signaller 11.

FIG. 4 shows a cross section through a conductive foam plastics strip 21 wherein the compressive forces act in the direction of the arrow B and which comprises, on only one of its sides, two electrodes 22, 23 extending over the entire length of the strip 21 and arranged parallel, at a spacing from each other, in the region of the side edges of the strip 21, these electrodes each being covered by a non-conductive plate 37. The side of the strip 21 opposite the electrodes 22, 23 is appropriately the side which comes into contact with the object which is to be protected from being trapped.

FIG. 5 shows an oblong conductive strip 21 more or less square in cross section, with the electrodes 22, 23 and plates 37 arranged on its adjacent longitudinal sides, which are at an angle of 90° to one another. In this embodiment, wherein the compressive forces can act in the direction of the arrows C, it is essential for the electrodes 22, 23 to be somewhat narrower than the relevant side of the strip 21 so that they do not meet at the common edge.

FIG. 6 shows an exemplary embodiment of a safety device of the kind which may be used, for example, on manually controlled power-operated apparatus such as presses. A foam plastics strip 21′, constructed as a tube slotted on one side and impregnated with conductive lacquer, is wrapped round a handle 38 made of non-conductive material which has to be gripped by an operator in order to switch on the drive for the apparatus. The electrodes 22', 23', which are connected to the voltage source 24 via the control mechanism 18, are arranged on the slotted edges 39 of the strip. Using this safety device, it is possible to control a power-operated apparatus, for example, so that it is stopped or put into reverse when the operator releases the handle with the strip 21', i.e. ceases to compress it. This has the result that, when the strip 21' is able to re-expand from its compressed state, the current-flow resistance increases and a relay in the control mechanism 18 can switch off the drive.

It will be seen, particularly from the exemplary embodiment shown in FIG. 6, that the safety device according to the invention can also be used as a command device in power-operated apparatus wherein normal mechanical switches cannot be used, e.g. in command devices for pressure-operated triggers on the ground, such as door mat controls.

The safety device according to the invention shown in FIG. 7 is mounted on double doors 112 of the kind used in rail vehicles such as trams or underground trains or in buses. The two leaves of the double doors 112 which move together when the doors close can be actuated separately by a drive (not shown in FIG. 7), for example a pneumatic drive, via a reversing valve located in a compressed air line. On their facing closing edges 113, the two leaves of the double doors 112 each have an electrical signaller 111 according to the invention, extending over the entire length of the edge, and connected to the relevant drive or both drives via a control mechanism (again, not shown in FIG. 7). When the signaller 111 responds during the closing of the double doors 112 or when there is a fault in the signaller 111, the drive for the double doors is stopped and/or put into reverse for the lifting movement.

Figure 8:
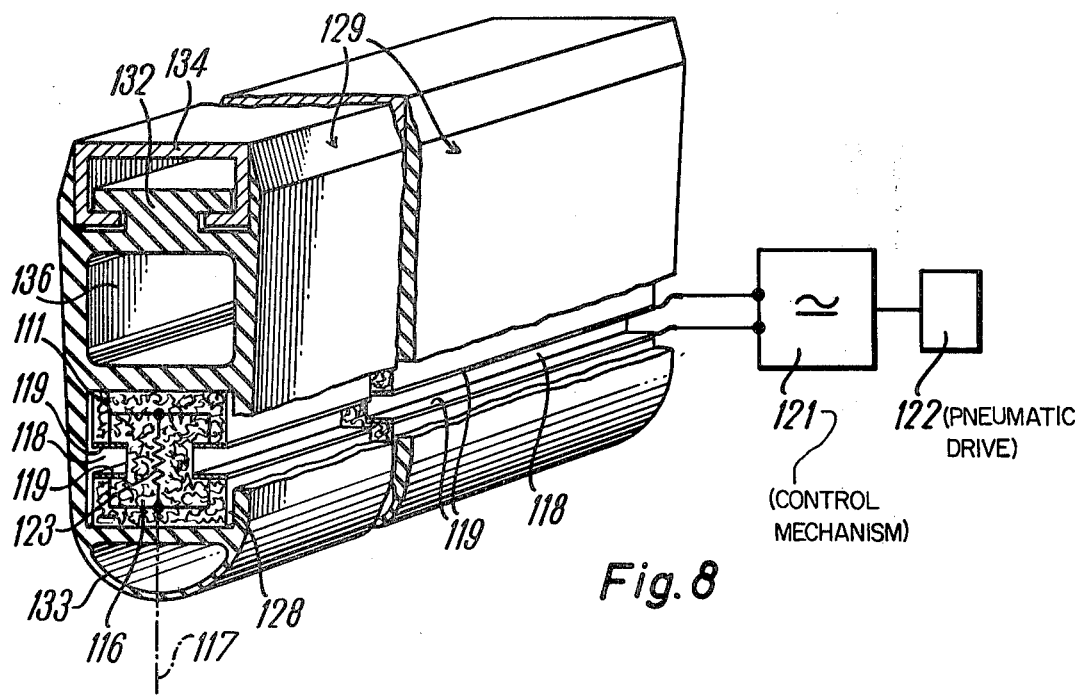
FIG. 8: a partly cut away perspective view of another embodiment of a signaller for a safety device according to the invention.

According to FIG. 8, the oblong signaller 111 consists of an elastically deformable insulating member 116 in the form of a strip, with a more or less rectangular cross section, made of foam or foam rubber. The insulating member 116 which is the same length as the door edge 113 comprises, at right angles to the central longitudinal plane 117, two grooves 118 extending symmetrically to the central transverse plane. The two opposite lateral walls of these grooves have strip-type electrodes arranged on them, for example stuck on. Thus, each groove 118 contains two electrodes 119 electrically insulated from each other lying one above the other in the direction of the central longitudinal plane 117. The electrodes 119 may be made of copper foil, for example, but may also be formed by conductive material sprayed on to the appropriate part of the insulating member 116.

The electrodes 119 also extend over the entire length of the insulating member 116. At one end, the electrodes 119, positioned above one another, are connected in pairs to a control mechanism 121 which is provided with an internal voltage source (not shown). The control mechanism 121 is in turn connected to the drive 122, whilst an electropneumatic transformer unit may be interposed between the control mechanism and the pneumatic drive 122. The other end of the two pairs of electrodes, connected to one another in parallel, is provided with a measuring resistor 123 which connects the two superimposed opposite-pole electrodes of each pair to one another.

The signaller 111 is inserted in a lengthwise cavity 128 in an elastic profile 129 made of rubber, for example, preferably prestressed by slight compression of the elastic insulating member 116. Owing to the rectangular cross section of both parts, the insulating member 116 cannot rotate inside the cavity 128. On its free end, the profile 129 has a rounded sealing lip 133 which forms another cavity shaped more or less like a half moon. On the opposite longitudinal side, which is firmly clamped in position, the profile 129 has a double T-shaped strip 132 by means of which the profile can be fixed in a correspondingly undercut clamping profile 134 on each closing edge 113 of the double doors. Between the double T-shaped strip 132 and the cavity 128 is provided a second cavity 136 which serves to absorb the run-on of the switched off drive 122 by its flexibility. The fixing strip 132 of the profile 129 is advantageously constructed so that it is interchangeable with the hitherto conventional air tubes for pressure wave safety devices, which are fixed on in the same way.

The safety device provided with the signaller 111 operates as follows:

In the resting position, i.e. when the double doors 112 are open, for example, the super-imposed electrodes 119 of each pair of electrodes are held at a certain spacing, as shown in FIG. 8. Since the electrodes 119 abut on a voltage source at one end and are bridged by the measuring resistor 123 at the other end, a specific quiescent current flows, which has the effect, via the control mechanism 121, of causing the drive 122 for the double doors 112 to close the doors.

If there is a person or object between the two closing edges 113 when the double doors 112 are closing, first the sealing lip 133 and then the elastically deformable insulating member 116 of the signaller 111 is compressed at this point as the hollow profile 129 of one or both leaves of the double doors 112 makes contact with the person or object. The compression of the insulating member 116 causes the superimposed electrodes 119 of at least one pair to move together and finally make contact. The contact between the electrodes 119 means that the measuring resistor 123 is bridged, i.e. short-circuited. The short circuit in turn leads to an increase in current compared with the current which flows in the resting state, and this results in a relay in the control mechanism 121 stopping or reversing the drive 122. In both cases, the drive 122 or the double doors 112 run on to some extent in the closing direction, but this can be absorbed by the flexibility of the profile 129, thanks to the second cavity 136. If the compression or crushing of the signaller 111 ceases, the resting state is restored and the drive 122 can be re-activated.

If, however, the signaller is damaged in any way, for example by a piece torn out of the insulating member 116 together with the electrodes 119, the current-flow resistance becomes infinite. The consequent change in the quiescent current triggers a relay, for example, in the control mechanism 121, which stops the drive. Thus, any damage to the signaller 111 prevents the double doors from closing.

Since the voltage supply is arranged at one end of the electrodes 119 and the measuring resistor 123 is at the other end, the signaller 111 according to the invention is able to monitor itself unrestrictedly, even if the measuring resistor 123 is defective, for example. The functioning of the signaller 111 is independent of the point at which the insulating member 116 is compressed and is not affected by whether the pressure is exerted at one point or along a line or over an area. Moreover, the response of the signaller 111 is independent of whether it is compressed only on one leaf or on both leaves of the double doors 112 at the same time.

Figure 9:
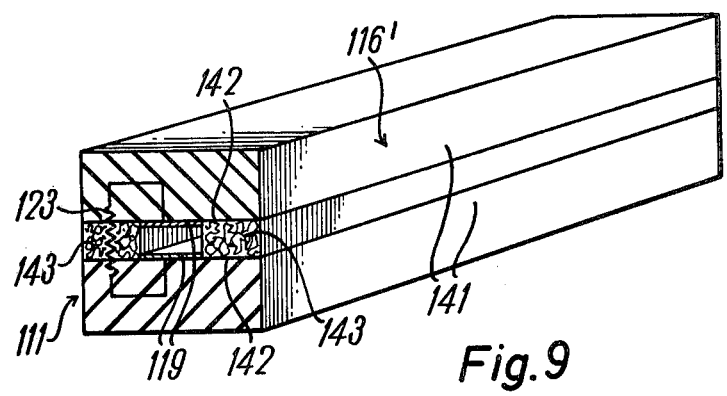
FIGS. 9 to 11: partly cut away perspective views of other exemplary embodiments of a signaller for the safety device according to the invention.
Figure 10:
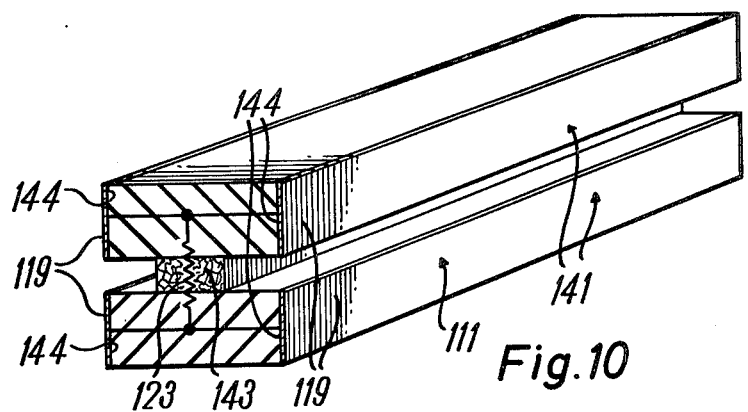
Figure 11:
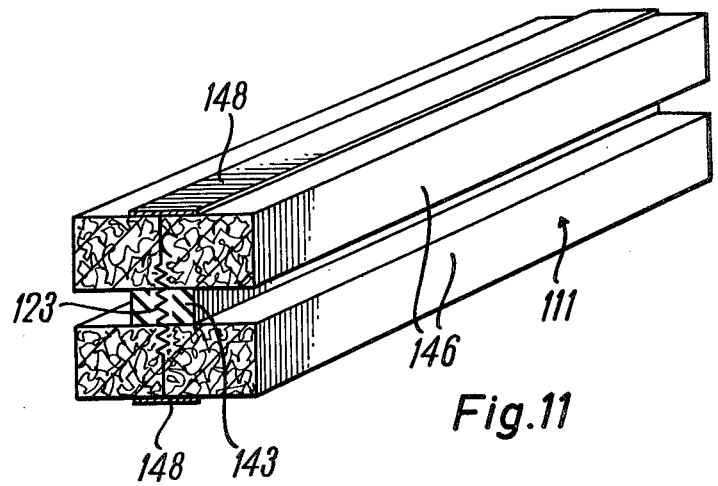

FIGS. 9, 10 and 11 show further exemplary embodiments of a signaller 111, whilst it should be remembered that the hollow profile 129 and the control mechanism 121 of FIG. 8 are also present, though not shown. The functioning of the signaller in these exemplary embodiments is the same as for the signaller according to FIG. 2; the only differences are the arrangement and design of the electrodes and insulating member.

According to FIG. 9, the member 116' which carries the electrodes 119 is of multi-sectional construction. The member 116' consists of two insulating strips 141 which are provided with the electrodes 119 in the region of the central longitudinal plane on the facing surfaces 142 of these strips and are held at a spacing by two lateral insulating strips. Whereas the insulating strips 143 are made from an elastically deformable foam or foam rubber, like the insulating member 116, the insulating strips 141 fitted with the electrodes 119 can either also be made from an elastically deformable material such as foam or foam rubber, or from a solid material. The cross section of this member 116' corresponds to that of the insulating member 116. Since, in this exemplary embodiment, the two electrodes 119 mounted one above the other extend in the central longitudinal plane of the member 116', for some purposes it is sufficient to use only one pair of electrodes.

FIG. 10 shows an exemplary embodiment wherein the signaller 111 also comprises two insulating strips 141, but these are held at a spacing only by an insulating strip 143 extending in the central longitudinal plane. Unlike in the embodiment in FIG. 9, in this case the electrodes 119 are mounted on the longitudinal sides 144 of the insulating strip 141. The electrodes 119 of an insulating strip 141 are in each case connected in parallel. By compressing the insulating strip 143, the electrodes 119 located with their narrow sides opposite each other are brought into contact.

FIG. 11 shows an exemplary embodiment wherein the signaller 111 is provided with two superimposed electrode strips 146 instead of the strip-type electrodes, and these are elastically deformable and held at a spacing by an insulating strip 143 which may be elastic or solid. The electrode strips 146 consist of open-celled, softly elastic foam plastics impregnated with a per se known electrically conductive lacquer. This conductive lacquer for example is introduced, preferably rolled, into the cellular polymer material in such a way that the walls of the open cells of the foam plastics are covered substantially completely and uniformly and are interconnected in electrically conductive manner by the conductive lacquer adhering to the walls. On the surface of the electrode strips 146 there may be provided electrically conductive bands 148 facing away from each other and connected to the voltage source, on the one hand, and the measuring resistor 123, on the other. Here, too, compression and contact of the electrode strips 146 at any point causes a change in the resistance of the closed circuit, thus producing a signal. Correspondingly, the resistance of this closed circuit also changes when the electrode strip or strips 146 is or are damaged. It should be understood that, instead of foam impregnated with conductive lacquer, it is also possible to use another conductive plastics or other elastically deformable conductive material. Besides mechanical damage, other external influences may also cause a change in resistance in the closed circuit, such as, for example, a conductive liquid, especially water, getting into the safety device. Undesirable effects of this kind are thus signalled.

I claim:

1. A safety device suitable for use in power operated apparatus for producing a safety control signal on contact between an obstacle and at least one part of the apparatus to control the further operation of said apparatus, said safety device comprising a resilient member attachable to a part of an apparatus, at least two electrodes associated with the resilient member and connectable to an electrical supply, means electrically interconnecting said electrodes and capable of passing a current indicative of unobstructed operation of said apparatus and means responsive to deformation of said resilient member following contact therewith to change the electrical conditions prevailing between said electrodes to vary said current and means capable of detecting the variation in current to produce said safety control signal.

2. Safety device according to claim 1 and in which said means electrically interconnecting said electrodes comprises said resilient member, said resilient member being adapted to have a first finite resistance in its undeformed condition and a different finite resistance in its deformed condition.

3. Safety device according to claim 1 and in which said means electrically interconnecting said electrodes comprises a resistor and wherein said electrodes are disposed spaced apart from each other and capable of contacting each other on deformation of said resilient member to bypass said resistor and thus form said means for changing the electrical condition prevailing between the electrodes for varying said current.

4. Safety device according to claim 2 in which said part of the apparatus comprises an elongate edge thereof and in which said resilient member is itself elongate and adapted for attachment to said edge, and in which said at least two electrodes are disposed spaced apart on the surface of said resilient member.

5. Safety device according to claim 4 and in which said resilient member is of rectangular section and said two electrodes are spaced apart along a single side surface of said resilient member.

6. Safety device according to claim 4 and in which said two electrodes are connected to opposite end faces of said elongate resilient member.

7. Safety device according to claim 4 and in which said resilient member is of rectangular section and said two electrodes are respectively connected to adjacent side faces of said resilient member.

8. Safety device according to claim 4 and in which said resilient member is located within a cavity in a rubber moulding said rubber moulding having at least one further elongate cavity positioned in front of said resilient member for providing additional resilience of the edge of the apparatus.

9. Safety device according to claim 4 and in which said resilient member comprises a cellular polymer material impregnated with a conductive lacquer.

10. Safety device according to claim 8 and in which said rubber moulding is provided with an elongate profiled part behind said resilient member for engaging a cooperating feature on the edge of said part to attach the moulding to that part.

11. Safety device according to claim 3 and in which said part of the apparatus comprises an elongate edge thereof and in which said resilient member is an elongate member extending along said edge, said resilient member having means defining a slot therein, said at least two electrodes being disposed on the resilient member to either side of said slot and said resistor being connected between the electrodes their one ends and said electrical supply being connectable to the electrodes at their other ends remote from said resistor.

12. Safety device according to claim 11 and in which said slot runs through the center of said resilient member.

13. Safety device according to claim 11 and in which a pair of slots are provided at either side of the resilient member and a pair of electrodes is associated with each said slot.

14. Safety device according to claim 11 and wherein said resilient member is located within a cavity formed in an elongate rubber moulding.

15. Safety device according to claim 14 and in which said rubber moulding includes means defining a further cavity in front of said resilient member.

16. Safety device according to claim 15 and in which said rubber moulding includes further means defining a further cavity behind said resilient member.

17. Safety device according to claim 15 and in which said rubber moulding is provided with an elongate profiled part behind said resilient member cooperable with a mating profiled part along the edge of said apparatus to secure the moulding to that part.

18. Safety device according to claim 11 and in which the surface of said resilient member beneath said at least two electrodes comprises strips of an open celled relatively flexible foamed plastic impregnated with an electrically conductive lacquer.

19. Safety device according to claim 1 and in which said apparatus comprises a vertical door and in which said resilient member is attached to the edge of the door.

20. Safety device according to claim 1 and in which said apparatus comprises a garage door and said resilient member is attached to the bottom edge of said garage door.

21. Safety device according to claim 1 and in which said apparatus comrises a press.

22. Safety device according to claim 1 and in which said apparatus includes a handle, said two electrodes being on opposite side of a resilient member in the form of a sheet of resilient material, said sheet of resilient material being wrapped around said handle.

23. Safety device according to claim 1 and in which said resilient material comprises an open celled cellular polymer material to which the conductive lacquer is applied by rolling whereby to provide the cell walls of said cellular polymer material with a substantially complete and uniform coating of said lacquer.

* * * * *